(12) United States Patent
Pozarnsky

(10) Patent No.: US 9,657,943 B2
(45) Date of Patent: May 23, 2017

(54) METHOD AND SYSTEM FOR REHEATING FLUE GAS USING WASTE HEAT TO MAINTAIN DRY CHIMNEY STACK OPERATION

(71) Applicant: GREAT RIVER ENERGY, Maple Grove, MN (US)

(72) Inventor: Jared D. Pozarnsky, Benedict, ND (US)

(73) Assignee: Great River Energy, Maple Grove, MN (US)

( * ) Notice: Subject to any disclaimer, the term of this patent is extended or adjusted under 35 U.S.C. 154(b) by 0 days.

(21) Appl. No.: 14/757,316

(22) Filed: Dec. 16, 2015

(65) Prior Publication Data

US 2016/0169510 A1 Jun. 16, 2016

Related U.S. Application Data

(60) Provisional application No. 62/124,367, filed on Dec. 16, 2014.

(51) Int. Cl.
| | |
|---|---|
| *F23J 15/00* | (2006.01) |
| *F23J 15/08* | (2006.01) |
| *F28C 3/02* | (2006.01) |

(52) U.S. Cl.
CPC ............ *F23J 15/08* (2013.01); *F28C 3/02* (2013.01); *F23J 2215/20* (2013.01); *F23J 2217/50* (2013.01); *Y02P 20/124* (2015.11)

(58) Field of Classification Search
CPC ........... F23J 15/006; F23J 2900/15081; F23J 2217/102; F22B 37/008; F27D 17/008
(Continued)

(56) References Cited

U.S. PATENT DOCUMENTS 3,148,665 A * 9/1964 Switzer, Jr. ........... F22B 1/1892
110/304
4,253,821 A * 3/1981 Bradshaw ............... F23J 11/00
34/85

(Continued)

FOREIGN PATENT DOCUMENTS

| EP | 1182400 | 2/2002 |
| WO | 2014/138079 | 9/2014 |

*Primary Examiner* — Gregory A Wilson
(74) *Attorney, Agent, or Firm* — Moss & Barnett

(57) ABSTRACT

Flue gas is a by-product of many energy and industrial plants and is typically emitted through a chimney stack. If the flue gas temperature in the chimney stack drops below the flue gas dew point, condensation of water vapor and acid gases ensues. These gases are very corrosive for chimney stacks designed to operate in a dry condition. The Flue Gas Reheat System of the present invention continuously and proactively manages flue gas chimney stack temperatures above the dew point in order to optimize emission control and effectuate energy efficiency improvements in industrial plants. Waste heat is harvested from the exterior surfaces of existing steam and pollution control equipment through conduction, convection and radiation. This heat is transferred to a working fluid. The working fluid is then directly mixed with the flue gas prior to the flue gas entering the chimney stack to raise the temperature of (or re-heat) the flue gas above its dew point to maintain a dry chimney stack condition. The use of residual or waste heat from throughout the plant and the minimal equipment required to harvest the waste heat reduces the operating cost and improves the overall reliability of the system. This method is useful in many industries, including electric power generation plants and other energy intensive process industries that seek emission control and various boiler and fuel energy efficiency improvements, many of which improvements result in a reduction in normal chimney stack temperature.

12 Claims, 7 Drawing Sheets
(4 of 7 Drawing Sheet(s) Filed in Color)

(58) Field of Classification Search
USPC .......................................... 122/1 R, 7 R, 7 C
See application file for complete search history.

(56) References Cited

U.S. PATENT DOCUMENTS

| | | | |
|---|---|---|---|
| 4,305,909 A | 12/1981 | Willett et al. | |
| 4,543,110 A * | 9/1985 | Engelhardt | B01D 53/48 423/242.1 |
| 4,705,101 A * | 11/1987 | Warner | B01D 53/002 165/104.31 |
| 5,247,907 A * | 9/1993 | Lee | C01B 3/38 122/1 R |
| 5,775,266 A * | 7/1998 | Ziegler | F22B 37/008 122/1 C |
| 5,878,675 A | 3/1999 | Iijima et al. | |
| 6,444,958 B1 * | 9/2002 | Campbell | F24C 15/101 126/21 R |
| 8,778,041 B2 | 7/2014 | Mitsui et al. | |
| 2006/0144043 A1 * | 7/2006 | Takeuchi | F22D 1/36 60/597 |
| 2010/0111777 A1 * | 5/2010 | Klingspor | B01D 53/504 422/168 |
| 2011/0308436 A1 * | 12/2011 | MacMurray | F23J 15/006 110/215 |
| 2015/0198330 A1 | 7/2015 | Qian | |

* cited by examiner

METHOD AND SYSTEM FOR REHEATING FLUE GAS USING WASTE HEAT TO MAINTAIN DRY CHIMNEY STACK OPERATION

CROSS REFERENCE TO RELATED APPLICATION

This application claims priority to U.S. Provisional Application 62/124,367 filed on Dec. 16, 2014, which is hereby incorporated by reference in its entirety.

FIELD OF INVENTION

The present invention relates to the fields of industrial plants, waste heat and thermal amplification. Specifically, the present invention relates to the utilization of both high grade (above 150° F.) and low grade (below approximately 150° F.) residual or waste heat available throughout a typical industrial process plant to re-heat flue gas before it exits a plant chimney stack to maintain dry chimney stack operations.

BACKGROUND OF THE INVENTION

Energy and industrial plants are required by law to capture certain contaminants emitted from plant operations. Some of these contaminants are generated by combustion in furnaces and/or boilers utilized to generate steam for various purposes. Flue gas, a natural by-product of combustion, carries a number of these contaminants, including sulfur. To remove sulfur from the flue gas, the flue gas is passed through a Wet Flue Gas Desulfurizer (WFGD) system before the flue gas exits the plant, typically through a chimney stack.

Environmental Protection Agency (EPA)—Mercury Air Toxics Standards (MATS) effective in 2017 create a new, more stringent regulation for Mercury and allows a sulfur dioxide ($SO_2$) measurement as a proxy for achievement. The new standard for power plants fueled by lignite coal is 0.015 lbs. $SO_2$/MM Btu of fuel. (Standards are different for different fuels.)

To meet the new emission standards, power plant efficiency improvements are frequently required. Many of these improvements have the effect of reducing flue gas temperatures at or in the chimney stack.

For chimney stacks designed to operate in a dry condition, the temperature of the flue gas in the chimney stack must be maintained above the flue gas water vapor dew point ("flue gas dew point"). If the temperature of the flue gas drops below the flue gas dew point, condensation of water vapor and acid gases ensues, which are very corrosive for these types of chimney stacks. Thus, reheat systems are required to keep the flue gas temperature above the dew point.

In the past, other reheat systems have been generally avoided in the industry due to high cost of operation and more significant maintenance requirements.

One solution to address this problem is to add a corrosive resistant heat exchanger in direct contact with the saturated flue gas to keep the flue gas warm, which is costly.

Another option is to redesign and replace the chimney stack so it operates in a wet condition, below the flue gas dew point, but this option is both capitally intensive and time consuming, limiting the magnitude and cost effectiveness of various emission reduction and efficiency improvements. A wet stack environment requires special design modifications and materials to avoid corrosion. These design modifications and the outage time to install would cost tens of millions of dollars in most applications.

Yet another option is to bypass a percentage of flue gas from each boiler around the flue gas desulfurization systems. This hotter flue gas mixes with flue gas desulfurization (FGD) outlet gas before the chimney stack and keeps the blended stack gas temperature well above the dew point temperature to keep chimney stack operating in a dry condition, above the flue gas dew point. (The FGD outlet gas is typically near the flue gas dew point as it exits the outlet.) Without this bypass gas to "reheat" the chimney stack gas, condensation will occur as the flue gas cools and rises through the chimney stack, leading to a corrosive "wet stack" environment. However, the cost for completing stack, ductwork, and drain modifications to successfully operate in a wet stack environment are extremely high and require long, costly operation outages to implement the modifications. Further, to meet the 2017 regulations, some power plants will need to scrub 100% of flue gas. This eliminates the opportunity to bypass a portion of the higher temperature flue gas and use its heat to raise the temperature of the lower temperature flue gas at the scrubber outlet. Without reheat, the fully saturated flue gas from the scrubber would condense in the stack, causing wet, acidic conditions leading to corrosion.

Thus, there remains a need for a low cost system to reheat the flue gas in a dry stack condition for energy and industrial plants looking to avoid the complications and retrofit expense of wet stack operations. Ideally, if sources of otherwise wasted heat can be utilized, the net plant heat rate (efficiency) of the power plant could be simultaneously improved.

SUMMARY OF THE INVENTION

The Flue Gas Reheat System of the present invention is a unique and useful method and system of continuously and proactively controlling flue gas chimney stack temperature at a prudent temperature margin above the dew point through the use of waste heat. Controlling flue gas temperature in the chimney stack is an essential component to optimizing energy efficiency in industrial plant operations.

Ideally, the flue gas temperature is as low as possible to maximize the thermal efficiency of the plant, yet high enough above the dew point to avoid condensation and corrosion. The theoretical lower limit is established by the Log Mean Temperature Differential (LMTD) or thermal driving force between the temperature of the flue gas and the ambient temperature.

The actual dew point temperature is typically in the range of 32° F. to 212° F. and depends on the temperature and relative humidity of the flue gas. The dew point can be estimated through look up tables in published Steam Tables (such as Keenan, Keyes, Hill & Moore (1969) *Steam Tables* (English Units) New York, N.Y.: John Wiley & Sons; Stultz, S. C. and Kitto, J. B. (1992) *Steam its generation and use—40th edition*. Barberton, Ohio: Babcock & Wilcox; Alduchov, O. A. and Eskridge, R. E. (1996) "Improved Magnus' form approximation of saturated vapor pressure". *Journal of Applied Meteorology and Climatology*. 35(4), 601-609.)) or calculated using the following formula:

$$T_{DP} = \frac{243.04 * \{LN[RH/100] + [(17.625 * T)/(243.04 + T)]\}}{\{17.625 - LN(RH/100) - [(17.625 * T)/(243.04 + T)]\}},$$

where $T_{DP}$ is the resulting dew point temperature in degrees Celsius, RH is relative humidity in percent and T is temperature of the flue gas in degrees Celsius. LN is the natural logarithm function.

The present invention utilizes a combination of high and low grade waste heat available within the plant to heat the flue gas before or as it enters the chimney stack to eliminate condensation and corrosion in the chimney stack. This improves plant efficiency by eliminating the need to utilize primary fuel to reheat the flue gas to offset the effects of installation of other energy efficiency improvements to the plant.

A typical energy plant includes a boiler building, an air heater for warming combustion ambient air before it is delivered to the boiler building, a fan room for delivering warmed combustion ambient air to the boiler room, flue gas ductwork for circulating flue gas through the plant, an electrostatic precipitator for removing solid particulate contaminants from flue gas, an induced draft fan for drawing flue gas through the boiler and precipitator to maintain a slight negative pressure in the boiler, a WFGD building for removing sulfur, an absorber tower for removing contaminants from the flue gas, a bypass duct typically for untreated flue gas used to warm treated flue gas, a mixing zone for blending the untreated and treated flue gas to raise the temperature of the collective flue gas exiting the plant, a chimney stack through which the flue gas exits the plant, and a continuous emission monitoring system (CEMS) to monitor the sulfur content of the flue gas as it exits the chimney stack, as more fully described below.

The Flue Gas Reheat System of the present invention utilizes waste heat throughout the electrostatic precipitator and flue gas ductwork, which heat is captured in a separately channeled working fluid. The heat from the working fluid is mixed with and reheats the flue gas before the flue gas enters the chimney stack. The flue gas is reheated to a temperature well above the flue gas dew point, thus allowing the chimney stack to remain in a dry state (above the dew point).

Some of the advantages of this unique Flue Gas Reheat System are:

A. Low capital cost since the Flue Gas Reheat System requires at least one fan, ductwork and insulation and is readily installed without major modifications to existing systems.

B. Low operating cost since the Flue Gas Reheat System requires no additional primary fuel supply and minimal auxiliary power to operate the fans.

C. Low maintenance costs.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Referring now to the drawings, wherein like reference numerals indicate corresponding structure through the several views.

DETAILED DESCRIPTION OF THE PREFERRED EMBODIMENT

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

To understand the flue gas reheat system and method of the present invention, it is necessary to first understand the components of a typical energy or industrial plant and the flow of flue gas through the plant.

Figure 1:
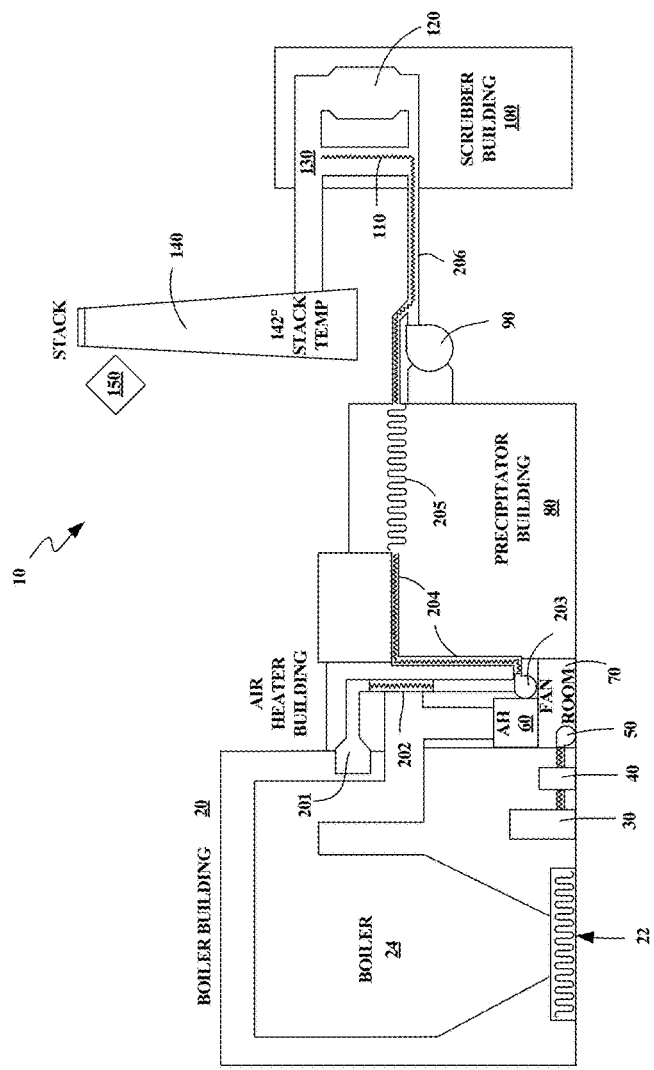
FIG. 1 is a schematic of the major components of the current invention.
Figure 2:
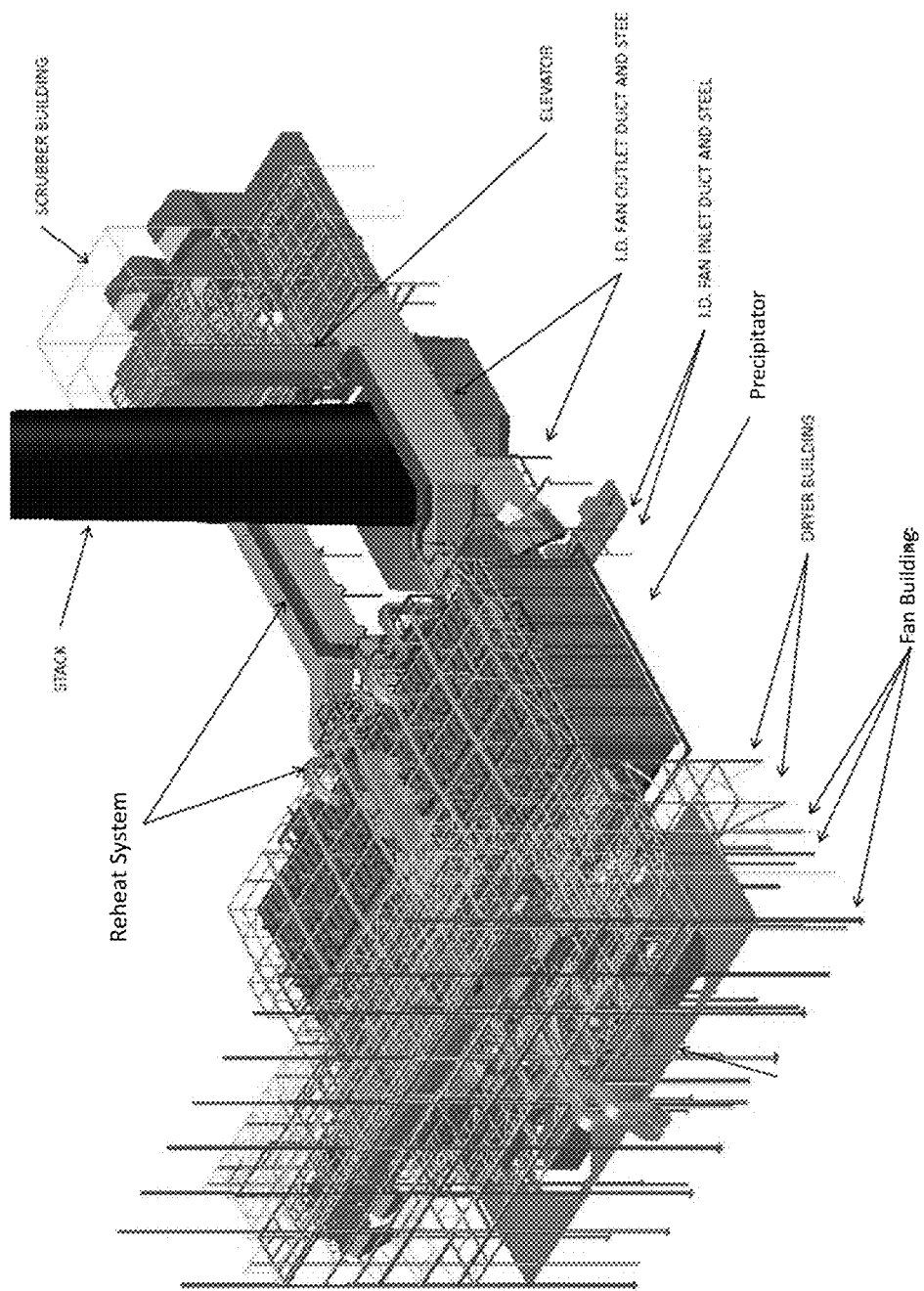
FIG. 2 is a perspective of the internal equipment and piping located within the structures identified in FIG. 1.

Referring to FIG. 1, a schematic of a typical energy plant 10 including the present invention, and FIG. 2, a schematic of the interior of the plant as shown in FIG. 1, the plant includes the following major components: a boiler building 20, a pulverizer 30, a primary air damper 40, a fan 50, an air heater 60 for warming combustion ambient air before it is delivered to the boiler building, a fan room 70 for delivering warmed combustion ambient air to the boiler room, an electrostatic precipitator building 80 for removing contaminants from flue gas, an induced draft fan 90 for moving the working fluid through the ductwork, a WFGD building 100 for removing sulfur, a bypass duct 110 containing untreated flue gas used to warm treated flue gas, an absorber tower 120 for removing contaminants from the flue gas, a mixing zone 130 for blending the untreated flue gas and the treated flue gas to raise the temperature of the blended flue gas exiting the plant, a chimney stack 140 through which the flue gas exits the plant, and a continuous emission monitoring system (CEMS) 150 to monitor the sulfur content of the flue gas as it exits the chimney stack, as more fully described below.

Boiler Building.

The boiler building 20 includes a furnace 22 used to heat a boiler 24. The furnace may burn any known fuel, but the present invention is particularly useful for lignite coal which contains sulfur. Typically, lignite is first heated by Primary Air (PA) and then run through pulverizers before being burned as fuel.

Heat radiating from the boiler 24 raises the temperature of the air inside the boiler building 20 throughout the year. Heated air is less dense and rises while cooler, denser air sinks. The temperature differential between this heated air and outside ambient air causes a natural draft or chimney effect drawing air up and out the top of the boiler building, while creating a negative pressure (slight vacuum) at the bottom levels. This pressure differential in a tall boiler building causes undesirable consequences including additional negative draft that have to be overcome by FD fans (discussed below) used to drive ambient combustion air to the boiler building. This increases the required horsepower & energy consumption of the FD fans. Further, miscellaneous heating, ventilating and air conditioning (HVAC) problems are created inside the air heater building associated with the Air Heater and Fan Rooms). Issues associated with a thermally induced chimney or chimney stack draft effect in the boiler building include a wind tunnel effect making it physically difficult to open doors and loss of plant efficiency due to station service for cooling towers.

Fans

Industrial plants use large fans to supply Primary Air (PA) to the furnace or boiler for proper combustion and to condition and transport solid fuel particles. These fans move a large volume of air, resulting in a significant pressure drop (several inches of water column) and consume significant energy (hundreds or thousands of horsepower). Variable speed fans are more efficient and respond well to changing conditions and loads. They are also more expensive. Single speed fans are less expensive, but less efficient and rely on louver type dampers to physically adjust the flow of air.

Dampers

Hot and cold PA dampers control and blend the flow of ambient (cold) and preheated (hot) combustion air to the coal pulverizers, to maintain appropriate operating temperature to heat and dry the fuel from outside ambient conditions throughout the year. See FIG. 6.

Reducing the temperature of the gas side inlet also acts to increase the efficiency of the air heater.

Fan Room.

The fan room is an enclosed area for fan equipment typically located at or near the base of the boiler building. Combustion air forced draft (FD) fans 50 are located in the Fan Room 70 and are used to drive ambient combustion air into the boiler building for use by the furnace.

Fan rooms are commonly designed to operate at neutral or slightly negative pressure (approximately 0.0 to −0.3 inches of water column). It is common for the natural draft induced by the vertical temperature differential in the adjacent boiler building to exacerbate the level of vacuum in the fan room especially in seasonally cold climates, and to reduce the efficiency of the fans by driving the operating pressure of the combustion ambient air lower than design (approximately −0.5 inches of water column). This can cause fan room coils to ice up and plug, resulting in further fan efficiency degradation.

ESP Building.

The electrostatic precipitator building houses electrostatic precipitators (ESP) and is typically located downstream of the solid fuel boilers. The precipitators remove solid particulates (or dust) from the flue gas to achieve select air emission standards prior to discharge of the flue gas to the environment through the chimney stack.

The Induced Draft Fan

The induced draft fan 90 moves the working fluid through the ductwork.

Absorber Tower

The Absorber Tower is the main part of the WFGD where a lime slurry contacts the flue gas, condensing out a portion of the $SO_2$ for capture, removal and disposal. A significant temperature reduction occurs from the enthalpy (latent heat of vaporization energy associated with the change of phase) from the "liquid" water and lime slurry absorbing heat out of the flue gas in order to vaporize liquid slurry droplets into "gaseous" water vapor at fully saturated conditions. The flue gas is fully saturated at the exit of the WFGD by design. Any further reduction in temperature will condense the water vapor back into a liquid.

Bypass

The Bypass Duct is a duct in the WFGD that is used to direct a small slip stream of untreated flue gas around the WFGD in order to maintain its original temperature, historically used for blending with fully saturated and treated flue gas to avoid dew point corrosion in downstream components and maintain a dry stack condition, since further travel up the stack reduces temperature of saturated flue gas below the dew point. Changing emission regulations have severely limited or eliminated the ability to bypass even a small portion of the flue gas for this reheating duty.

Mixing Zone

The Mixing Zone is a section of ductwork and dampers used for blending treated and untreated flue gas to obtain a blended outlet temperature at a prudent margin above saturation temperature to avoid condensation in the stack.

Chimney Stack

The Chimney stack is a tall, vertical enclosure to direct flue gases up and out of the plant into the environment. The chimney stack is surrounded by ambient air which is almost always below the dew point. The flue gas continues to cool toward ambient temperature as it naturally rises through the chimney stack and eventually mixes with ambient air. Therefore, to maintain a dry stack condition all the way up the height of the chimney stack, the temperature of the flue gas must have a margin of safety (approximately 12° F. in typical industrial plants—depending on the height of the stack and temperature differential between the flue gas and ambient temperatures and wind speeds) to allow for additional cooling throughout the path up the stack without passing through the dew point temperature.

CEMS

The continuous emission monitoring system (CEMS) includes instruments for measuring parameters such as: flows, temperatures, velocities and regulated emissions such as: opacity, particulate, sulfur dioxide ($SO_2$) and mercury (Hg). This data may also be used as a control signal to operate and adjust flows and temperatures throughout the plant to maintain emission compliance and flue gas reheat temperatures.

Present Invention

It is common practice in industries combusting solid or liquid fuels containing sulfur to employ Flue Gas Desulfurization equipment (FGD) or "scrubbers" as a pollution control device to capture and remove sulfur (S) and its related forms in the flue gas to achieve sulfur dioxide ($SO_2$) emission regulations. A Wet Flue Gas Desulfurization (WFGD) is one type of FGD device that sprays calcium carbonate ($CaCO_3$) or "lime" mixed with water (to form a wet lime slurry) in an absorber section to capture and remove a portion of the sulfur (and its related forms) in the flue gas. The wet slurry saturates the flue gas which reduces the temperature by more than 100° F.

The WFGD is physically located immediately upstream of the chimney stack to minimize any equipment or ductwork contact with the fully saturated and potentially corrosive flue gas. The temperature of the flue gas is reduced throughout the wet WFGD to exit at fully saturated (water vapor) conditions. With any further reduction in temperature of the flue gas, the water vapor will condense out of the flue gas as a liquid and condense on the sidewalls of the chimney stack and run down the inside walls of the chimney stack (by gravity) with entrained sulfur. Sulfur dioxide ($SO_2$) and sulfur trioxide ($SO_3$) in flue gas of sulfur bearing fueled boilers in the presence of water vapor ($H_2O$) react to form sulfuric ($H_2SO_3$) and sulfurous acids ($H_2SO_4$) respectively.

$$SO_2 + H_2O \rightarrow H_2SO_3$$

$$SO_3 + H_2O \rightarrow H_2SO_4$$

Beyond the challenges of maintaining flue gas temperatures affected by the process of removing sulfur, industrial plants also need to improve their energy efficiency from time-to-time to meet increasing regulations and remain competitive. However, many efficiency improvements result in energy being extracted and utilized from the flue gases, reducing residual or waste heat throughout the system. This also results in a lower chimney stack temperature.

The dew point of the flue gas represents a very practical constraint, below which further efficiency improvements would necessitate major capital expenditures for redesign and replacement of chimney stacks designed to operate in a wet condition, or adding a large, expensive, corrosion resistant heat exchanger (with additional pressure drop and power consumption) in direct contact with the saturated flue gas and the condensing acids on system components, or finding alternate means of re-heating the flue gas prior to entering the chimney stack.

The present invention utilizes a combination of high and low grade waste heat available within the plant improves energy efficiency by avoiding additional primary fuel to perform this work while enabling other energy efficiency improvements that would otherwise lead to condensation and corrosion in the chimney stack. The present invention avoids costly equipment and maintenance requirements of prior art solutions and also provides improved efficiency benefits of its own by reducing the energy normally required to dissipate other waste heat through fans, pumps and cooling towers.

A further advantage of the present invention is the active control of the flows to maintain the proper temperature rise of the working fluid to maintain both the final temperature of the blended flue gas above the dew point with an appropriate margin and the overall emissions using Continuous Emission Monitoring (CEM) devices in the chimney stack. This functionality is an essential component to optimizing energy efficiency in industrial plant operations.

Figure 3:
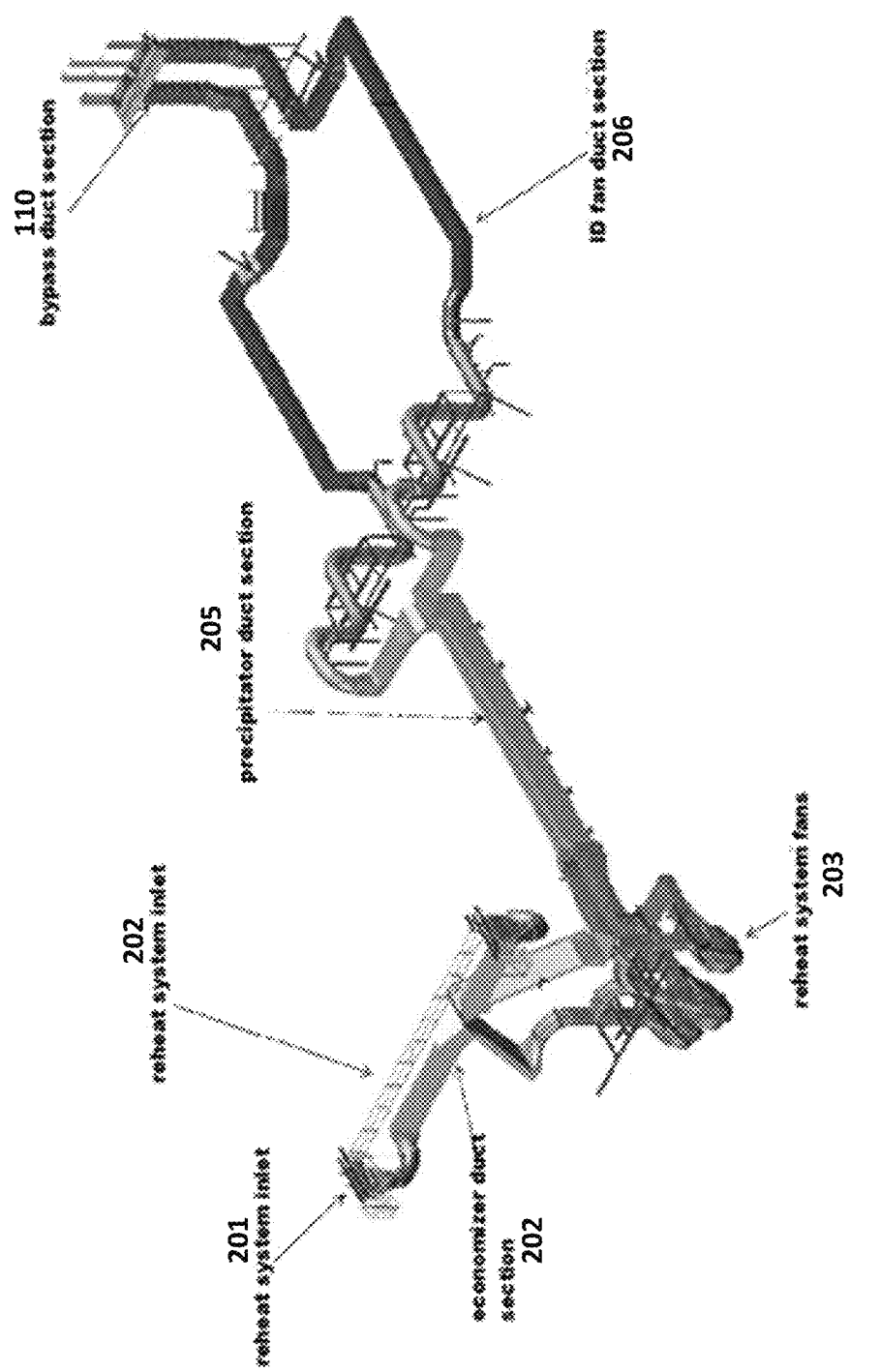
FIG. 3 is a perspective view of the ductwork of the reheat system of the present invention.

Referring to FIGS. 1 and 3, the key components of the Flue Gas Reheat System of the present invention include a reheat Working Fluid Intake 201, an economizer duct section 202, at least one reheat fan 203, a transitional duct to the ESP building 204, a precipitator duct section 205, an ID fan duct section 206, a bypass section 110 and a mixing zone 130.

Figure 6:
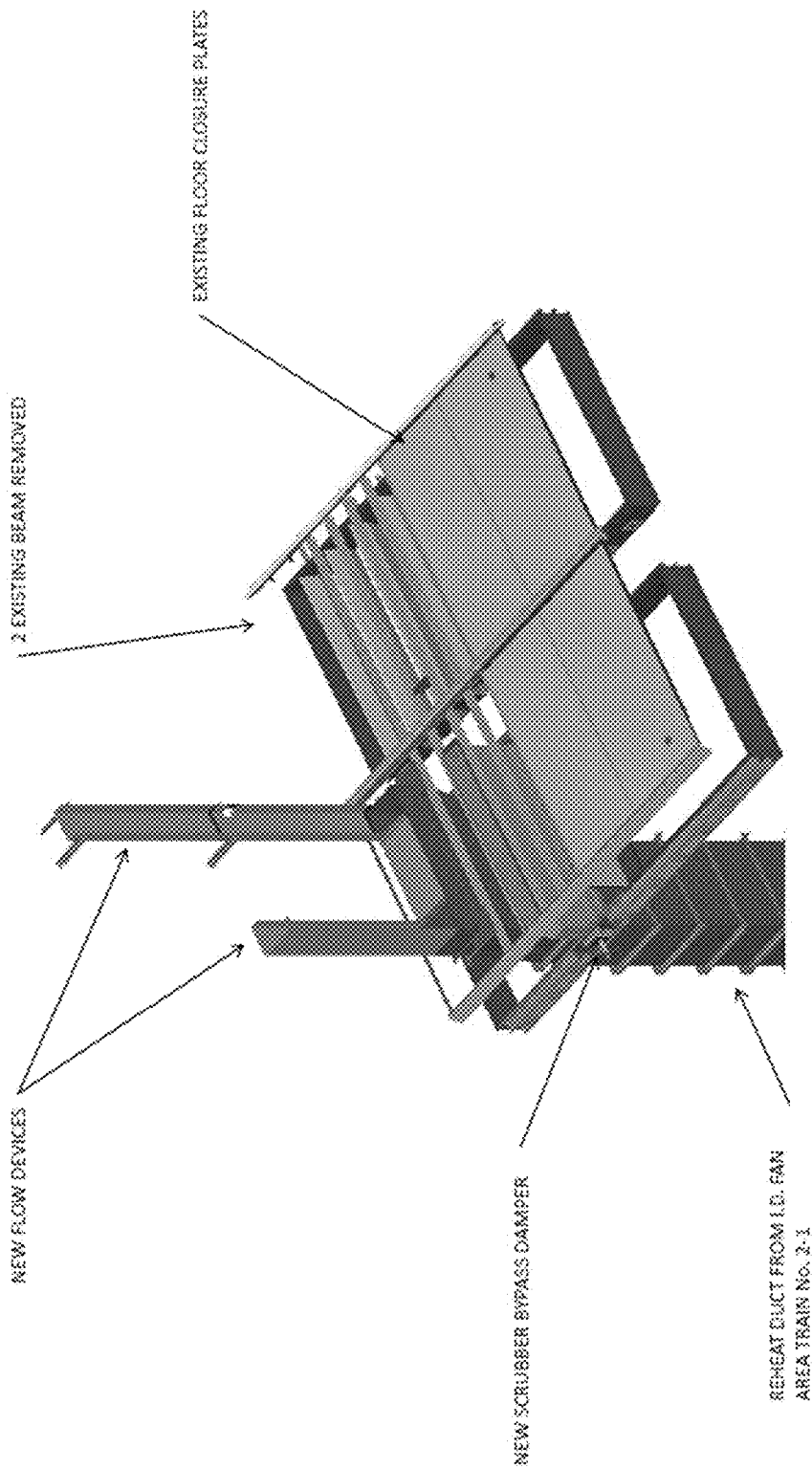
FIG. 6 is a schematic of one preferred embodiment of the present invention utilizing twin dampers.

FIG. 3 reflects one preferred embodiment of the ductwork of the present invention including twin ID fan ducts. FIG. 6 reflects twin parallel fan duct dampers. The number and configuration of fan duct sections and dampers, as well as the other components of the present invention, are driven by current conditions at the plant and what is possible and required to install the present invention, since plants have different designs and configurations. Other embodiments of the present invention having a different number or configuration of ducts, fans, inlets, etc. are contemplated by the present invention.

The main heat source components of the system are a working fluid (air) and initial thermal input from the boiler building, additional thermal input from the electrostatic precipitator, and final supplemental thermal input from the flue gas ductwork.

In temperate climates where boilers are not enclosed, the ambient temperatures remain more stable throughout the year, and the working fluid for the Flue Gas Reheat System will come from the surrounding air. In cooler climates, the boiler is frequently enclosed and the enclosure typically provides the required volumes of ambient air—working fluid for the reheat system.

Reheat Working Fluid Intake

The reheat working fluid intake inlet ductwork to the air heater is used to draw boiler building air (working fluid), at approximately 90° F., from an economizer inlet plenum area of the boiler building into the reheat system. (Outside ambient make-up air varies from −25° F. to +90° F., but inside the boiler building the ambient air is heated to approximately 90° F. year round through conduction, convection and radiation from the exterior of the boiler equipment.) This reduces the temperature of the flue gas inlet to the air heater. While this reduces the heat available to preheat the combustion air, it also leads to a reduction of hot Primary Air (PA) air temperature to the solid fuel pulverizers required to warm the coal (where so equipped, not shown).

Figure 4:
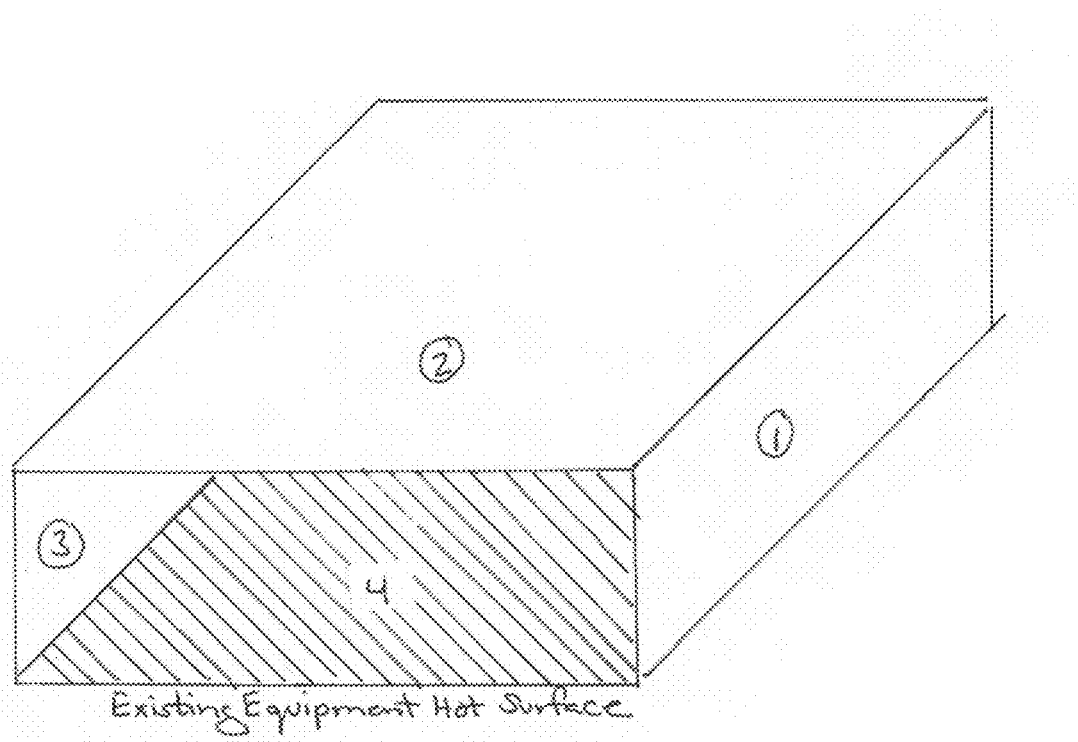
FIG. 4 is a cross-section of the three sided duct of the present invention.

The working fluid (heated ambient air) is ducted or directed through a three sided channel shown in cross-section in FIG. 4. The three sides include 1, 2 and 3; side 4 is a side of an existing equipment hot surface, such as an ESP duct.

Figure 7:
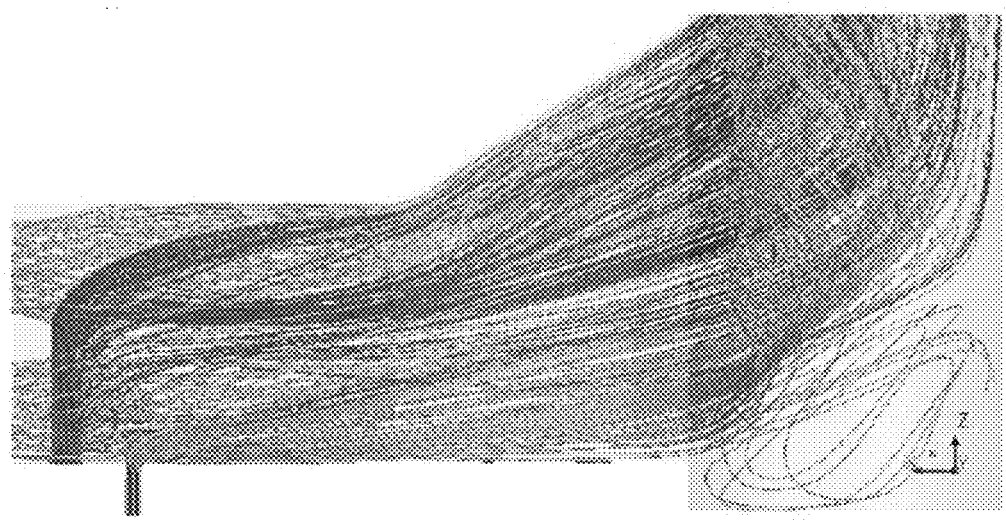
FIG. 7 is a schematic of the flow patterns in the mixing zone and chimney stack.

Waste heat is transferred to the working fluid in the channel through the hot surface 4 of existing equipment. The working fluid is eventually blended with treated flue gas in the mixing zone before the flue gas enters the chimney stack, reheating the flue gas to keep the temperature of the blended flue gas above the flue gas dew point. The flue and air flows through the mixer are shown in FIG. 7.

Economizer Duct

The Economizer Duct Section is normally insulated and directs the flue gas from the boiler outlet to an air preheater, where the heat is transferred from the flue gas to preheat the ambient combustion air (Primary Air). The Flue Gas Reheat System implementation removes a portion of the existing insulation from the outer surface of the economizer duct section, and a new three sided "channel" is added to the economizer duct section, as shown in FIG. 4, using the existing hot outer surface of the economizer duct as the fourth side and heat exchange surface of the channel.

In one preferred embodiment, the channel is generally rectangular, but one side of the rectangle is from the economizer duct; however, other configurations are possible. A key element of the configuration is to maximize heat transfer between the economizer duct and the channel; here obtained by having one hot, uninsulated side of the economizer duct also serve as a common wall with the channel. This common wall becomes the active heat transfer surface between the duct and channel.

Figure 5:
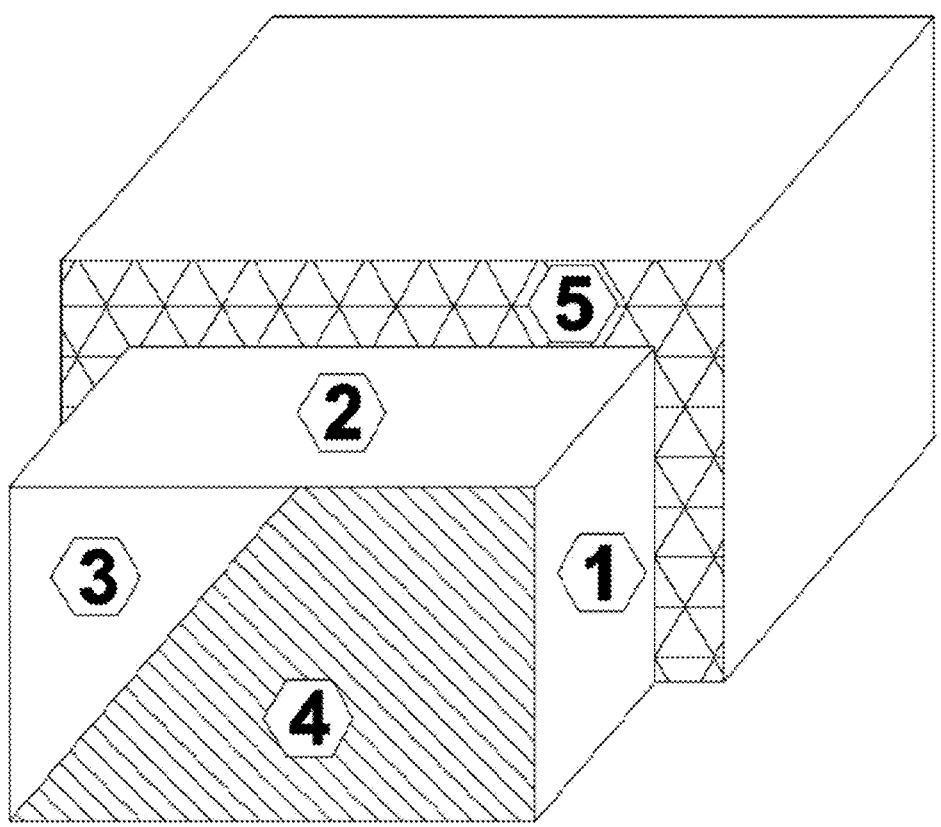
FIG. 5 is a cross-section of the three sided duct of the present invention, combined with the economizer duct and wrapped in insulation.

This new duct is re-insulated (see "5" in FIG. 5) to keep heat transferred in the working fluid, and reduce heat losses to the environment.

The temperature of the flue gas inside the economizer duct section is approximately 800° F. (high grade heat). The ambient air working fluid inside the new channel duct is heated from approximately 90° F. to 270° F. through conduction and radiation without any direct contact between the flue gas and the working fluid. This high grade "waste" heat provides the majority of the thermal energy required for flue gas reheat.

The Flue Gas Reheat System uses some of the energy from the economizer duct section, before air preheaters typically found in industrial plants, reducing the temperature of the hot primary air and reducing the need to blend in more cold primary air. By opening up the hot PA dampers slightly, the pressure drop and required horsepower is reduced resulting in a slight reduction in energy usage and station service.

Optional Bypass damper(s) are designed to bypass a relatively small volume of flue gas around the WFGD system, in order to provide additional heated flue gas for blending. In one preferred embodiment, the volume of gas bypassed around the WFGD would be 0 to 3%.

Reheat Fans

Referring to FIG. 1, Induced draft (ID) fan 90 provides all of the force to pull in ambient reheat working fluid into the Working Fluid Intake. A spare fan may also be installed for operational redundancy.

Electrostatic Precipitator (ESP)

The heated working fluid must travel from the boiler intake area to the mixing zone, often several hundred feet away. Heat losses occur even with insulated ductwork, so the Flue Gas Reheat System routes the working fluid ductwork adjacent to hot flue gas path and equipment along the way.

Waste heat emanating from the Precipitator Enclosure creates a secondary heat exchanger space to pick up additional heat by channeling the working fluid in completely enclosed ducts to cover this distance toward the mixing zone.

Routing the working fluid in close proximity to the high temperature ESP enclosure provides a free source of high quality waste heat to make up for heat losses along the way. In some embodiments, completely enclosed, four sided ductwork is used in this area due to surface irregularities and enclosure stiffeners across the ESP.

The hot flue gas travels through the ESP Ductwork Section at approximately 270° F., which maintains the temperature of the heated working fluid overcoming heat losses as it travels from the boiler building to the chimney stack.

ID Fan Duct

The induced draft fan 90 pulls flue gas through the boiler and precipitator to maintain a slight negative pressure in the boiler, and also pushes flue gas through the WFGD to the chimney stack.

Bypass Duct

New Bypass Duct sections are inserted into a new or existing WFGD bypass duct to carry the heated working fluid directly into the mixing zone. Untreated flue gas through the bypass damper serves to keep the final flue gas blend at the desired temperature.

Mixing Zone.

The Mixing Zone is the area where the WFGD outlet saturate flue gas, the hot working fluid and optional bypass (untreated) flue gas are mixed to raise the temperature of the final mixture above the dew point by a prudent margin while still achieving the emission standards.

Thorough mixing of the flue gas and working fluid is essential to raising the temperature of the flue gas entering the chimney stack to prevent condensation and corrosion. Referring to FIG. 4, the blue lines represent the flow of the WFGD treated and saturated flue gas entering the chimney stack the majority of the flow (84 to 100% by volume); the orange lines represent the flow of the Flue Gas Reheat working fluid through the chimney stack (heated air addition representing 0 to 16% of the final mixed flow in the chimney stack); and the red lines represent the flow of the Optional Bypass fluid through the chimney stack, untreated hot flue gas (minor volume).

The mixed air from the reheat system, the bypassed flue gas and also the flue gas exiting the FGD outlet will travel downstream to the chimney stack. The hot air from both the reheat system and the bypass flue gas will provide additional heat to the fully saturated outlet gas of the FGD system and keep the mixed gas in the chimney comfortably above dew point until it exits the top of the chimney.

Stack Inlet.

The blended and reheated flue gas enters the base of the stack at approximately 150° F. where it travels upward past the Continuous Emission Monitors out the top of the 680 foot tall stack at approximately 140° F.

CEM Monitor.

The CEM monitors stack temperature output data from thermocouples for active speed control using Variable Frequency Drives ("VFD") for reheat system ID Fans. Sulfur Dioxide ($SO_2$) output data from the CEMs are used for position control on the bypass dampers to control the volume and velocity of the working fluid at the Mixing Zone.

Chimney Stack Outlet.

Reheated Flue Gas exits the top of the stack at a temperature above the dew point and in compliance with emission regulations.

Key Components for Flue Gas Reheat System Control.

The bypass dampers and reheat fan system operate independently of one another. The reheat fans operate on variable frequency drives (VFD) controlled to a user defined stack temperature set point. The higher the stack temperature set point the higher the output on the VFD for each fan. The reheat system may be designed to provide a margin of 12° F. above saturation temperature on its own without the aid of the bypass gas.

The bypass dampers may be controlled by a user set $SO_2$ set point signal from the CEMs with a prudent margin to account for reaction time. This will provide the proper margin for $SO_2$ compliance, while adding thermal energy to the mixed gas.

This dual but separate control will ensure $SO_2$ limit compliance while minimizing the heat required of the reheat system.

One Preferred Embodiment

Referring to FIG. 2, an example of one preferred embodiment, the Flue Gas Reheat System may consist of one or more ductwork runs and positive displacement fans that sit on the air heater deck (shown as two parallel duct work runs for illustration only). Redundancy fans may also be installed.

The inlet of the system may be the top of the economizer ductwork above the air heaters. The area above the ductwork may be curtained off causing the air for the system to be drawn exclusively from the adjacent boiler building. The reheat ductwork may adjoin the skin of the 800 degree F. economizer ductwork and pick up roughly 120 degrees F. before the inlet of the reheat fans below. The ductwork will then carry the now 200+ degrees F. air through the center of the precipitator chambers where the air may be supplemented with heat from the adjacent precipitator chambers. After the precipitator section the reheat duct May adjoin the induction fan ductwork using this hot surface to preserve the heat gained through previous parts of the system.

The reheat duct may enter the bypass ductwork in the scrubber building and delivery the 200+ degrees F. ambient air into the mixing zone to combine with the scrubbed flue gas on the outlet of the Flue Gas Desulfurization system. From here the mixed gas will go to the chimney.

Plant Heat Rate

Typical plants have some form of heat sink to dispose of excess waste heat from the thermal cycle. Many plants use cooling towers where hot water is circulated (sometimes called circ water) to dissipate excess heat through evaporation. This loop can be useful in moving heat from one area in the plant to another before it is finally routed to the cooling towers.

To mitigate the HVAC (heating, ventilation, air conditioning) effects on the boiler building from the reheat system suction, a system to inject warm air into the bottom of the building may be added. This system may use a hot water loop on the lower floors of the boiler building to allow cold ambient air to be brought in with the natural draft of the building. Thermal energy (heat) can be added to the cold air, replacing the air that is leaving the building at the upper floors through the reheat system.

This loop can be heated using condenser water typically available in an energy plant coming back from a turbine. Typical temperatures of this water range from 110-115 degrees F. and in the winter this will result in a temperature rise of the air entering the building of over 100 degrees F. from ambient.

It has also been discovered that taping about 10° Fahrenheit of hot primary air (reducing a typical initial temperature of 640° Fahrenheit to 630° Fahrenheit) and closing cold primary air dampers reduces wasted heat to maintain a fuel feed set point into the pulverizer to (150° F. to 160° F.).

It has also been discovered that the Continuous Emission Monitoring device in the chimney stack can be used to control the dampers and flows and temperature of the flue gas and working fluid to achieve the desired $SO_2$ emission set point.

The present invention further includes dampers in the ductwork and thermocouples in the chimney stack to control the dampers and flows and temperature of the flue gas and working fluid to avoid condensation within the chimney stack.

This system has the following benefits to the plant:
A. It lowers the temperature of the circulating water system (condenser water). The Flue Gas Reheat system reduces the thermal unloading on the cooling towers and gives an overall net heat rate gain for the plant. This will make up for the loss of temperature of the flue gas into the air heater caused by the economizer duct section of the reheat system
B. It negates the negative pressure effect of the reheat system suction on both the boiler building and the fan room improving fan efficiency (by reducing fan horsepower because the delta P is reduced) and reduces fan room coil plugging (which further improves fan efficiency).
C. It adds thermal energy (heat) to the boiler building ensuring that the minimum temperature supplied to the reheat system inlet is met at all times.
D. Using low grade waste heat (below approximately 150° F.), less energy is spent in eliminating it through a cooling tower (fan and pumping energy is reduced)
E. Can be used simply to redirect heat air to the fan room in industries, building heat, etc.
F. Allows for higher temperature heat to be used productively for many efficiency improvements (not just low grade).

System Configurations

The Flue Gas Reheat System can be designed in a number of different configurations. The location of the fans, and the design of the specific ductwork section in the reheat system can vary greatly according to the degree of reheat needed. Factors that may drive system variations could be but are not limited to:
1) Actual ambient temperature conditions of location
2) Percent margin needed to stay above wet stack dew point
  (a) $SO_2$ scrubbing margin
  (b) Station $SO_2$ limits and Flue Gas Desulfurization (FGD) efficiency
3) Station layout and power availability
4) Flue gas ductwork design
5) Station operating conditions

The invention claimed is:

1. A system for reheating industrial plant flue gas using waste heat, the industrial plant having a working gas source, a furnace including a boiler and a heat source for heating the boiler that produces flue gas during operation, flue gas hot ductwork through which the flue gas circulates, the flue gas hot ductwork having at least one heat transfer wall, a wet flue gas desulfurizer operatively connected to the flue gas hot ductwork for treatment of the flue gas, a gas mixing zone for receiving and blending flue gas exiting the wet flue gas desulfurizer and the working gas, and a chimney stack for receiving the blended flue gas and working gas, the system including:
  a. a three sided working gas ductwork mounted to the flue gas hot ductwork such that the heat transfer wall of the existing flue gas hot ductwork serves as a fourth wall of the three sided working gas ductwork;
  b. wherein the working gas is circulated through the three sided channel and the thermal energy from the flue gas is transferred to the working gas through the heat transfer wall by conduction, convection and radiation; and
  c. wherein the hot flue gas is circulated through the wet flue gas desulfurizer for treatment and is then physically blended with the warmed working gas in the gas mixing zone to heat the flue gas above a flue gas vapor dew point of the flue gas prior to the combined gas mixture entering the chimney stack.

2. The system for reheating flue gas of claim 1 wherein the working gas is ambient air.

3. The system for reheating flue gas of claim 1 including a boiler building housing the furnace and wherein the working gas is ambient air from the boiler building heated by radiation, conduction or convection from the furnace.

4. The system for reheating flue gas of claim 1 further including a boiler building housing the furnace and a steam condenser, and wherein the boiler heats water to steam that is circulated through the steam condenser to condense the water, and the condensed water is utilized to preheat air in the boiler building, which heated air serves as the working gas.

5. The system for reheating flue gas of claim 1 wherein the flue gas hot ductwork is insulated except for the heat transfer wall.

6. The system for reheating flue gas of claim 1 further including a pulverizer for pulverizing fuel to be burned in the furnace and hot and cold working gas dampers for blending of cold ambient air with hot combustion air at approximately 640-670° F. for delivery to the coal pulverizers to maintain a fuel feed set point into the pulverizer of 150° F. to 160° F.

7. The system for reheating flue gas of claim 6 further including an induced draft fan with a variable frequency drive and a continuous emission monitoring system including thermocouples, wherein the induced draft fan draws flue gas through the boiler and the continuous emission monitoring system measures chimney stack flue gas temperature output data to control the variable frequency drive to open the cold working gas damper to improve efficiency and plant heat rate.

8. The system for reheating flue gas of claim 1 further including working gas dampers and continuous emission monitoring system that measures chimney stack flue gas temperature output data to control the dampers, working gas flows and temperature of the flue gas and working gas to achieve a desired sulfur dioxide emission set point for the flue gas exiting the wet flue gas desulfurizer.

9. The system for reheating flue gas of claim 1 further including dampers in the flue gas ductwork and the working gas ductwork and thermocouples in the chimney stack to control the dampers, gas flows and temperature of the flue gas and working gas to prevent condensation within the chimney stack.

10. The system for reheating flue gas of claim 1 further including a high temperature electrostatic precipitator that removes fine particles from the flue gas, the precipitator having at least one hot surface that can serve as a fourth side of the three channel working gas ductwork, wherein the working gas ductwork is mounted to the electrostatic precipitator such that the electrostatic precipitator provides the fourth side of the three sided working gas duct to absorb waste heat from operation of the electrostatic precipitator into the working gas through radiation, conduction or convection.

11. The system for reheating flue gas of claim 1 wherein the three sided working gas ductwork combined with the heat transfer wall of the flue gas ductwork has a substantially rectangular cross-section.

12. The system for reheating flue gas of claim 1 further including high temperature equipment having at least one hot surface that can serve as the fourth side of the three channel working gas ductwork, wherein the working gas ductwork is mounted to the equipment such that the equipment provides the fourth side of the three sided working gas duct so the working gas absorbs waste heat from the equipment hot surface by radiation, conduction or convection.

* * * * *